No. 744,969. PATENTED NOV. 24, 1903.
J. LAUTH.
VEHICLE WHEEL.
APPLICATION FILED AUG. 6, 1903.
NO MODEL.
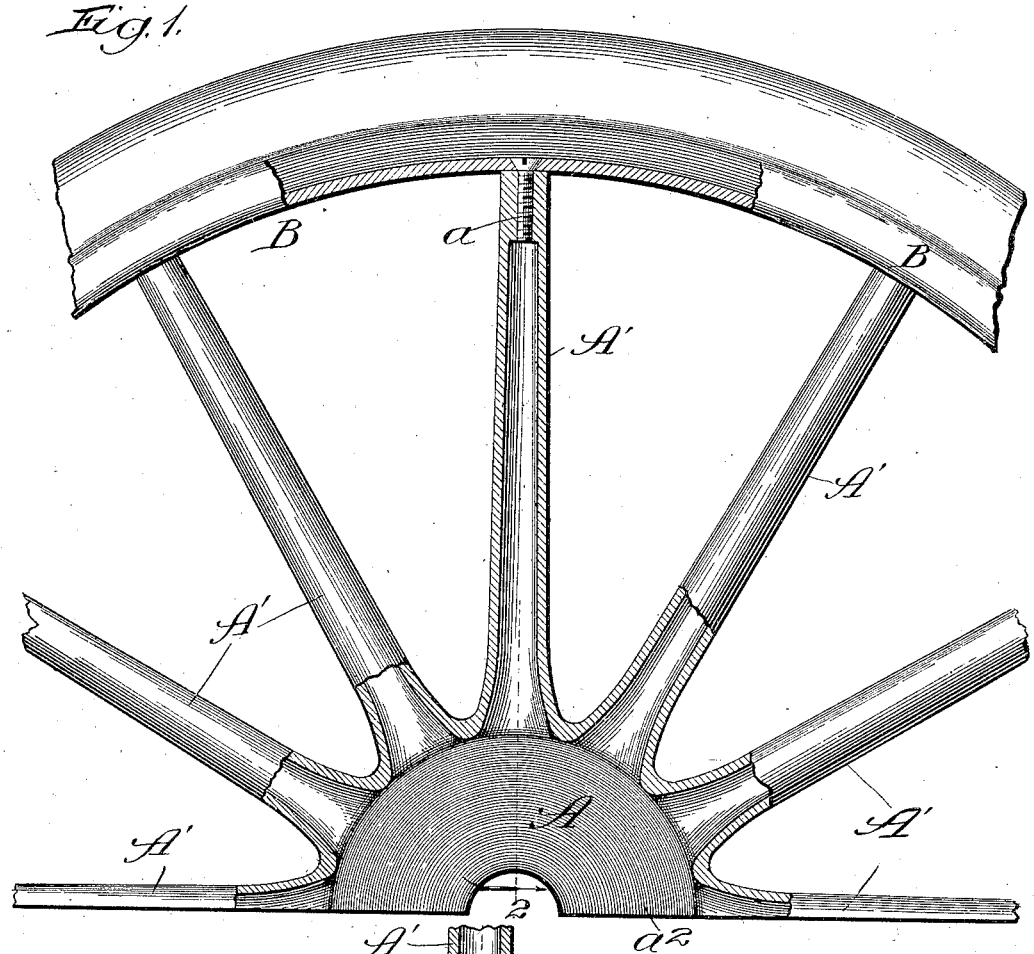
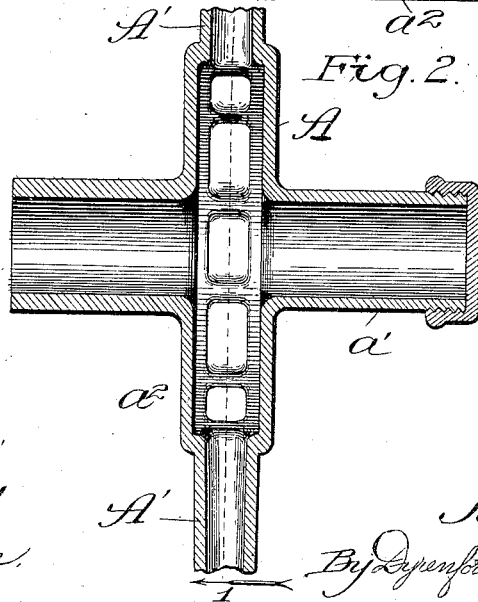

No. 744,969. Patented November 24, 1903.

UNITED STATES PATENT OFFICE.

JACOB LAUTH, OF CHICAGO, ILLINOIS.

VEHICLE-WHEEL.

SPECIFICATION forming part of Letters Patent No. 744,969, dated November 24, 1903.

Application filed August 6, 1903. Serial No. 168,447. (No model.)

*To all whom it may concern:*

Be it known that I, JACOB LAUTH, a citizen of the United States, residing at 94 Rawson street, Chicago, in the county of Cook and State of Illinois, have invented a new and useful Improvement in Vehicle-Wheels, of which the following is a specification.

My invention relates particularly to motor-vehicle wheels which undergo a torsional strain in being propelled by the vehicle-carried motor.

My primary object is to provide a light, strong, and economical wheel particularly adapted to the purpose suggested.

Experience has demonstrated that built-up tubular spoke-wheels are deficient in the connections between the spokes and hubs, inasmuch as the connections thereat give way under the continual jarring strain imposed thereon.

My invention is illustrated in the accompanying drawings, in which—

Figure 1 represents a broken vertical sectional view of my improved vehicle-wheel, and Fig. 2 a broken transverse vertical section taken as indicated at line 2 of Fig. 1.

I accomplish my object by casting a hub A and spokes A' integrally with each other, both the hub and spokes being hollow. At the outer ends of the spokes the size of the bores is reduced, thereby affording a greater thickness of metal, and the spokes are internally tapped thereat to receive the screws $a$, by means of which the rim B is attached.

The hub comprises a barrel $a'$ and a central hollow annular enlargement $a^2$, from which the spokes radiate. The metal is thickened somewhat at the junctions of the spoke-bases, and care is taken to preserve curves instead of sharp angles.

A cast-steel wheel constructed as described has the required strength and lightness, overcomes the objection noted, and readily assumes the popular artillery-wheel shape.

In casting the wheel a sand or sand and wire core is employed, so that it can be readily destroyed and removed after the casting operation.

Having thus described my invention, what I regard as new, and desire to secure by Letters Patent, is—

1. A vehicle-wheel, comprising a hollow hub and hollow spokes radiating therefrom and cast integrally therewith, for the purpose set forth.

2. A vehicle-wheel, comprising a hollow hub having a barrel and hollow central annular enlargement, and hollow spokes radiating from said enlargement and cast integrally with the hub, for the purpose set forth.

3. A vehicle-wheel, comprising a hollow hub and hollow spokes cast integrally therewith and tapped at their free extremities, and a rim secured by threaded connections with said spokes, for the purpose set forth.

JACOB LAUTH.

In presence of—
L. HEISLAR,
SAML. G. PRINCE.